Figure 1:
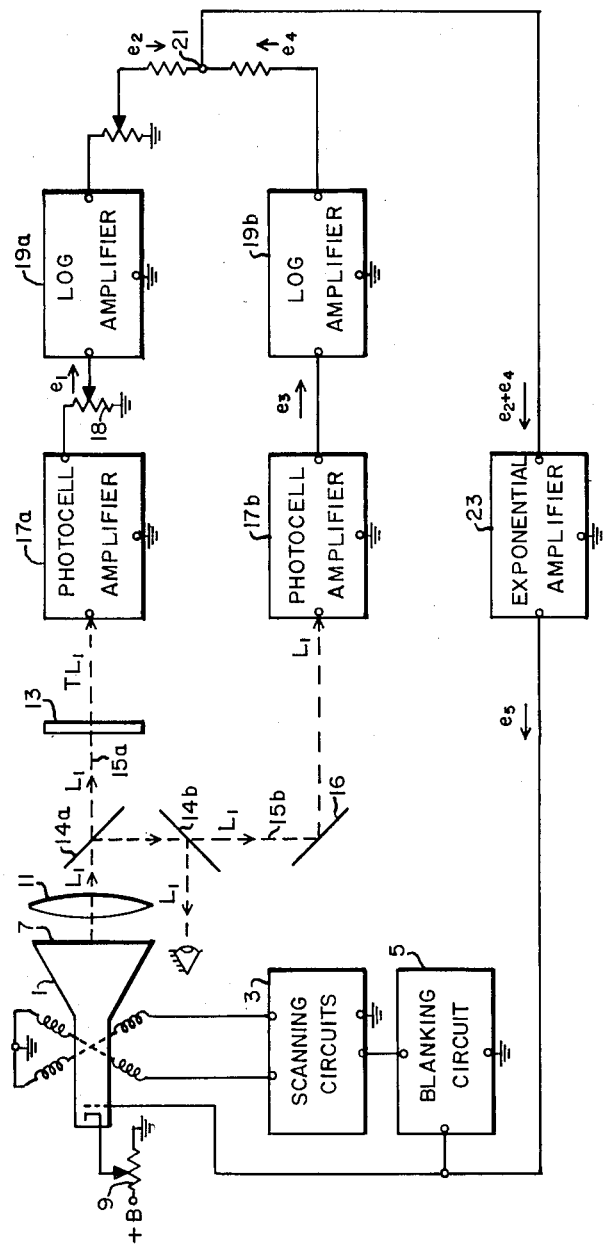

Patented Mar. 28, 1961

2,977,407

ELECTRONIC PREVIEWER FOR PHOTOGRAPHIC PROCESSES

Charles J. Hirsch, Princeton, N.J., assignor to Hazeltine Research, Inc., a corporation of Illinois Filed Feb. 10, 1960, Ser. No. 7,871

11 Claims. (Cl. 178—5.2)

This invention pertains to means for predicting the effects of different adjustments of a photographic process for obtaining positive reproductions of given negative photographic images, and particularly to an electronic previewer for displaying in advance an electronic preview image of the positive photograph which will be obtained from a given negative photograph by means of such a process.

At the present time the quality of the positive photograph which will be obtained from a given negative photograph is highly variable, depending to a great extent on the skill of the individual photographic artisan. This is true both where a separate positive film is employed for producing the positive photograph and where the negative image is itself reversed on the same film to achieve that result. This situation has recently been greatly alleviated by the advent of the electronic previewer disclosed in the copending application of W. F. Bailey, B. D. Loughlin, and C. E. Page for "Electronic Previewer for Negative Color Film," Serial No. 662,199, filed May 28, 1957, and assigned to applicant's assignee. This equipment very accurately simulates each of the photographic processing operations for obtaining the positive as well as its visual characteristics so as to produce an electronic image nearly identical thereto. It may, therefore, be utilized to determine the proper adjustments of the photographic process so as to yield a positive picture of optimum quality. However, this equipment is relatively complex and expensive, and is of principal interest to large scale film processing laboratories seeking results suitable for commercial use. In the case of development of ordinary amateur photographs, where extremely accurately controlled results are not generally necessary, the expense involved in utilizing such equipment may not be considered justified. A need therefore exists for a simpler previewer capable of achieving acceptable accuracy at much lower expense.

One approach to a previewer of this type includes a cathode-ray tube for scanning the negative photograph and a high gain negative feedback loop by which a given increment in the scanning light transmitted by the negative produces a control signal which causes an opposite increment in the intensity of the scanning light. If the signal amplification is very large, an electronic image will be formed on the screen of the tube wherein the light value at each point is nearly inversely related to the transmission of the negative at the corresponding point. If the transmission of the positive print to be produced from the negative was inversely proportional to the negative transmission, this electronic image would closely portray the positive print which would actually be obtained. In fact, however, the film development process involves a highly nonlinear relation between the negative and the positive print, the density of the positive being logarithmically related to the light transmitted by the negative. Additionally, in the case of color photographs, the respective color dyes which are produced in the positive, in response to respective primary color components transmitted by the negative, cause absorption of other color components of the light transmitted by the positive besides that to which each dye individually corresponds. These factors must be taken into account if the electronic image produced by the previewer is to be sufficiently accurate for use in determining how to best control the photographic process.

An approximation of the foregoing nonlinear relation between the density of the positive and the transmission of the negative photograph may be based on the fact that it has a substantially constant logarithmic slope or "gamma" under most of the range of film exposures usually encountered. The particular gamma value in any given case is dependent on the type of positive film employed and the photochemical development procedure. Knowing the applicable value, attempts have been made to introduce an analogous logarithmic signal-translation characteristic into the essentially linear electro-optical feedback loop comprised in the previewer. This has, however, been difficult to achieve without resorting to complicated and expensive equipment which is difficult to maintain in proper operation.

Accordingly, an object of the invention is to provide an electronic previewer of relatively simple and inexpensive construction and which is adjustable to produce an electronic preview image of the positive photograph which will be obtained from a given negative photograph by a correspondingly adjusted photographic development process.

A further object is to provide such a preview wherein simulation of the gamma applicable to the positive photograph is effected as an integral part of the previewer construction and operation.

A further object is to provide a simple and inexpensive electronic previewer which is adjustable to produce an electronic preview color image of the positive color photograph which will be obtained from a given negative color photograph by a correspondingly adjusted photographic development process, including simulation of the gamma employed in the photographic process and of the cross-coupling between the various color dyes formed in the positive photograph.

An electronic previewer in accordance with the invention is adapted to produce an electronic preview image of the positive photograph which will be obtained from a given negative photograph by a photographic development process. Such a previewer comprises scanning means for producing a beam of scanning light of an intensity dependent on a control voltage supplied thereto. The previewer also comprises means for directing the scanning beam along each of a plurality of paths of which at least one includes the negative photograph. It further comprises a plurality of electro-optical means respectively responsive to the light transmitted by the negative photograph in the foregoing one path and to that in at least one of the other paths to produce corresponding electrical signals. Nonlinear signal processing means are also provided for nonlinearly modifying and combining those signals so as to derive a resultant control signal which is supplied to the scanning means to control the intensity of the scanning beam produced thereby, the signal modification and combination being such that the relationship between the intensity of the scanning beam and the transmission of the negative photograph is the same as the relationship between the transmissions of that photograph and the positive photograph to be obtained therefrom. As a result, the light produced by the scanning means will form the desired electronic preview image of the positive photograph.

A more detailed description of various embodiments of the invention is presented in the following specification and accompanying drawings, but it should be noted that the actual scope of the invention is pointed out in the appended claims.

Figure 2:
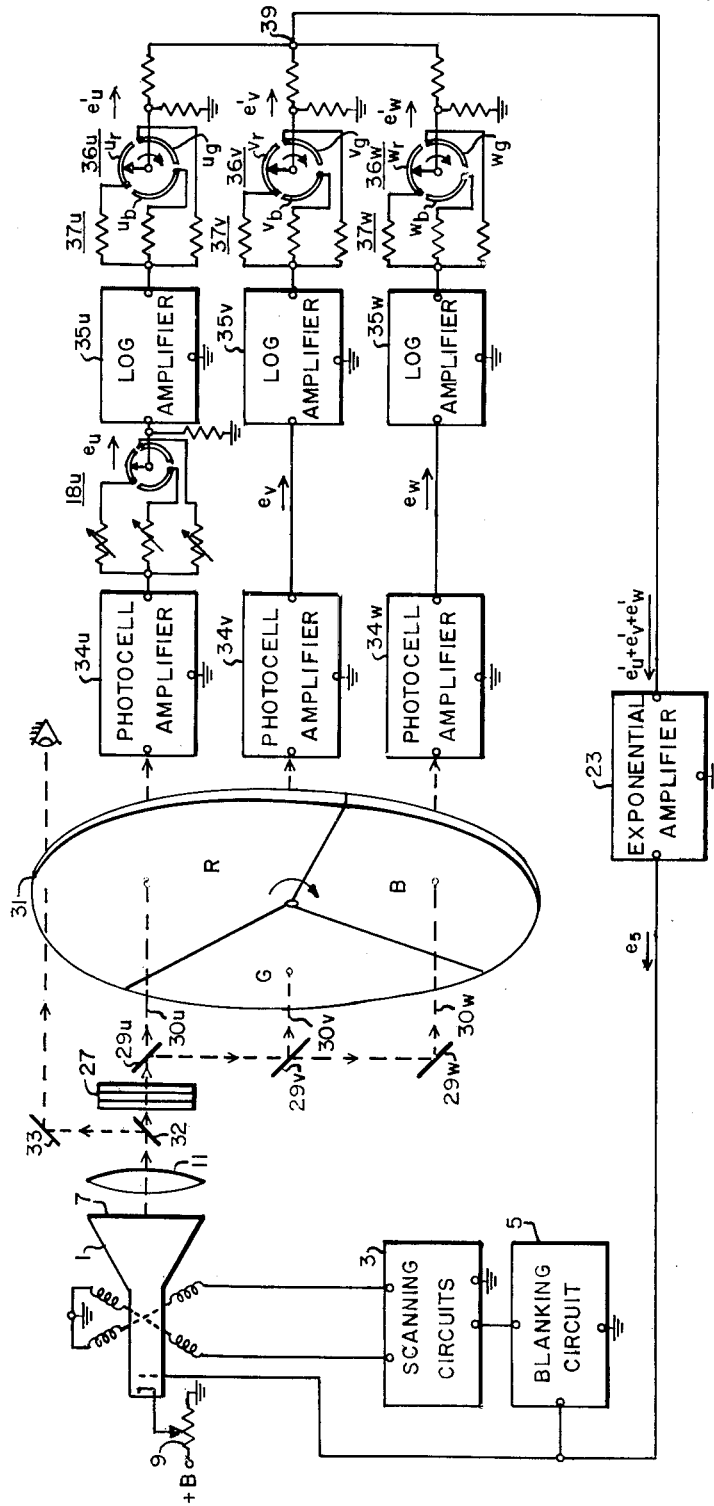

Fig. 1 is a circuit diagram of a previewer in accordance with the invention for simulating positive black-and-white prints obtainable from black-and-white negatives, and Fig. 2 is a circuit diagram of a previewer in accordance with the invention for simulating positive color prints obtainable from color negatives.

Electronic previewer of Fig. 1

Fig. 1 is a circuit diagram of a particular embodiment of an electronic previewer in accordance with the invention which is adapted to produce an electronic preview image of the positive photograph which will be obtained from a given negative photograph by a photographic development process. This embodiment is particularly aimed at simulating positive black-and-white prints obtainable from black-and-white negatives. The photographic characteristics to be simulated may be formulated by noting that a light intensity L incident on the negative photograph will result in a light intensity TL in the development of the positive print thereof, T being the transmission at any point of the negative. If the gamma of the photographic process is denoted "$\gamma$," the resultant density $D_+$ of the positive will be approximately given by:

$$D_+ = \gamma \log K_1 TL \tag{1}$$

where $K_1$ is a constant for a given development process. The corresponding transmission $T_+$ of the positive will then be:

$$T_+ = 10^{-\log D_+} = (K_1 TL)^{-\gamma} = \left(\frac{1}{K_2 T}\right)^{+\gamma} \tag{2}$$

where $K_2$ is also a constant.

Considering now the manner in which the foregoing relationship (2) is simulated by the previewer circuit in Fig. 1, the circuit comprises scanning means for producing a beam of scanning light of an intensity dependent on a control voltage supplied thereto. More specifically, the scanning means may include a cathode-ray tube 1 together with conventional scanning and blanking circuits 3 and 5 by which a spot of light is produced on luminous screen 7 and is deflected to form a rectangular scanning raster thereon. The quiescent intensity of the flying spot of light so produced may be controlled by means of the bias potentiometer 9 connected to the cathode of tube 1. The light intensity actually produced at any point will depend on the control voltage supplied to the control grid. The scanning means may also include the condensing lens 11 adjacent screen 7 for forming the light thereon into a sharply focussed scanning beam. The previewer circuit also comprises means for directing the scanning beam along each of a plurality of paths of which at least one includes the given negative photograph 13. This may include, for example, a pair of half-silvered mirrors 14a and 14b, a portion of the light emerging from lens 11 being transmitted by mirror 14a along a first path 15a to negative photograph 13 and another portion being reflected by mirror 14a to mirror 14b. The latter transmits a portion of the light along a second path 15b, and also reflects another portion thereof to a position at which it may be visually observed, thus permitting visual observation of the electronic image formed by the light on screen 7. The light in path 15b is then reflected by a fully silvered mirror 16 into another portion of path 15b parallel to path 15a.

The previewer further comprises a plurality of electro-optical means respectively responsive to the light transmitted by negative photograph 13 in path 15a and to that transmitted in at least one of the other light paths to produce corresponding electrical signals. More particularly, since in the described embodiment one other such path 15b has been provided, a pair of electro-optical means will suffice. Such electro-optical means comprise the photocell amplifiers 17a and 17b respectively responsive to the intensity of the light transmitted by negative photograph 13 in path 15a and of that in path 15b to produce corresponding electrical signals $e_1$ and $e_3$. Amplifier 17a may have an adjustable output potentiometer 18, so that the gains of both photocell amplifiers are equal when the potentiometer tap is in its mid-position. Signal $e_1$ will be proportional to $k_1 TL_1$, where $L_1$ is the scanning light intensity on screen 7 and $k_1$ is the gain adjustment effected by potentiometer 18. Signal $e_3$ will be proportional to $L_1$ alone.

The complete previewer in Fig. 1 also comprises nonlinear signal processing means for nonlinearly modifying and combining the signals $e_1$ and $e_3$ so as to derive a resultant control signal $e_5$ which is supplied to the above-described scanning means to control the intensity of the scanning beam produced thereby, the signal modification and combination being such that the relationship between the intensity of the scanning beam and the transmission T of negative photograph 13 is the same as the relationship between the transmission of the negative and that of the positive to be obtained therefrom by the actual photographic development process. More specifically, such nonlinear signal processing means may comprise the logarithmic amplifiers 19a and 19b for logarithmically modifying each of signals $e_1$ and $e_3$ and combining the modified signals so as to derive a resultant logarithmic control signal at the terminal 21. The non-linear signal processing means may also include means such as the exponential amplifier 23 for deriving a control signal $e_5$ corresponding to the antilog of the logarithmic control signal, and for applying it to the control grid of cathode-ray tube 1 to control the intensity of the scanning beam it produces so as to tend to maintain the magnitude of control signal $e_5$ substantially constant. The signal modification and combination effected by logarithmic amplifiers 19a and 19b is such that the above-described relationship between the transmission of negative photograph 13 and the scanning beam intensity is obtained. To this end, the amplifier 19a modifies the signal $e_1$ logarithmically while the amplifier 19b modifies the signal $e_3$ logarithmically and also in accordance with the gamma employed in the actual photographic process for deriving the positive print of negative 13. The resulting modified signals $e_2$ and $e_4$ are then additively combined to derive a logarithmic control signal at terminal 21. The latter signal is applied to the exponential amplifier 23, which derives the corresponding antilog control signal $e_5$.

In detail, logarithmic amplifier 19a modifies the input signal $e_1$ applied thereto to derive an output signal $e_2$ given by:

$$e_2 = \tfrac{1}{2} \log k_1 e_1 = \log (k_1 TL_1)^{\frac{1}{2}} \tag{3}$$

Similarly, logarithmic amplifier 19b modifies the input signal $e_3$ applied thereto to derive an output signal $e_4$ given by:

$$e_4 = \frac{1}{2\gamma} \log e_3 = \log (L_1)^{1/2\gamma} \tag{4}$$

The modified signals $e_2$ and $e_4$ are then added by applying them through respective equal resistors to the terminal 21, the summation signal $e_2 + e_4$ obtained thereat being given by:

$$e_2 + e_4 = \log\left[ (Tk_1)^{1/2}(L_1)^{\frac{\gamma+1}{2\gamma}} \right] \tag{5}$$

This logarithmic control signal is then converted to the corresponding antilog control signal $e_5$ for controlling tube 1 by means of the exponential amplifier 23, signal $e_5$ being:

$$e_5 = 10^{(e_2 + e_4)} = (Tk_1)^{1/2}(L_1)^{\frac{\gamma+1}{2\gamma}} \tag{6}$$

Bias control potentiometer 9 of cathode-ray scanner tube 1 may be set so the tube is biased near cutoff. That is, when control signal $e_5$ is zero the scanning light on screen 7 will be substantially at the black level. Under this condition the scanning light intensity $L_1$ will vary substantially in proportion to the square of the control signal amplitude. The scanning light intensity will, therefore, be:

$$L_1 = k_2 e_3^2 = k_2 \left[ (Tk_1)^{1/2} (L_1)^{\frac{\gamma+1}{2\gamma}} \right]^2$$

from which $$L_1 = \left( \frac{1}{k_2 k_1 T} \right)^\gamma \qquad (7)$$

where $k_2$ is a constant for any particular scanner.

Comparison of Equation 7 relating the intensity of the scanning beam to the transmission of negative photograph 13 with Equation 2 above relating the transmission thereof to that of the positive photograph obtained therefrom shows that the two are of identical form. As a result, the image formed by the scanning light on screen 7 will constitute the required electronic preview image of the positive photograph. In addition, the factor $k_1$ corresponds to interposing a neutral filter in the path of the printing light incident on the negative photograph and having a transmission proportional thereto.

The nonlinear amplifiers 19a, 19b, and 23 in the Fig. 1 previewer may each be of the type widely known in the television art as "gamma-correctors," a variety thereof being described on pages 219–224, inclusive, of Principles of Color Television by the Hazeltine Laboratories Staff, published in 1956 by John Wiley & Sons, Inc. Such amplifiers may have either a logarithmic or exponential signal-translation characteristic, both types being described therein.

In utilizing the previewer of Fig. 1 to control the production of a positive photograph from the given negative photograph, the control potentiometer 18 may be varied from an initial calibration setting so as to obtain the best possible appearance of the observed image seen in half-silvered mirror 14b. A proportionate adjustment of the neutral filter transmission employed to control the printing light intensity in the photographic development process will then yield a positive print of substantially the same appearance. The initial calibration may be established by first obtaining a print prepared from any negative by the photographic process being simulated, and adjusting potentiometer 18 until the electronic image closely resembles that print when the associated negative is scanned. It is, therefore, clear that the previewer of Fig. 1 constitutes a relatively simple and inexpensive device for removing much of the guesswork from photographic development processes and for obtaining substantially optimum results in all cases.

*Electronic previewer of Fig. 2*

Applicant's invention is equally applicable to photographic processes for producing color pictures, the embodiment thereof in Fig. 2 being adapted to produce an electronic preview color image of the positive color photograph which will be obtained from a given negative color photograph by a photographic color development process whereby a set of primary color dyes is produced in the positive photograph in response to the transmissions of the negative photograph for the same primary color components. As illustrated, such as previewer comprises scanning means for producing a beam of scanning light on the given negative color photograph 27, the beam intensity being dependent on a control voltage supplied to the scanner. Such scanning means may be substantially the same as in Fig. 1, comprising the cathode-ray or scanning tube 1 and associated scanning and blanking circuits 3 and 5 as well as the bias setting potentiometer 9 and condensing lens 11.

A principal difference between the previewer of Fig. 2 for color photographs and that of Fig. 1 for black-and-white photographs arises from the fact that the various color dyes in a positive color photograph have overlapping spectral absorption characteristics. That is, although cyan, magenta, and yellow dyes are respectively produced therein in response to the red, green, and blue components of the light transmitted by the negative photograph, those dyes do not actually individually absorb only those individual color components of the light incident on the positive photograph when it is viewed. For example, the magenta dye absorbs a substantial amount of blue and a lesser amount of red besides its principal absorption of green light. Similar cross-coupling effects exist among all the dyes in varying degrees. Accordingly, the relationship between the intensity of each primary color component of the light transmitted to the eye by the positive color photograph and the respective transmissions of the negative photograph for all those color components depends upon all of the latter transmissions and not just on the one for the corresponding color component. Specifically, suppose that the red, green, and blue transmissions of the negative photograph at any point thereof are $T_r$, $T_g$, and $T_b$. If the transmission of a completely clear area of the negative photograph is $T_o$, which will be a constant for a given type of negative film, and if the printing light emergent from such an area is $L$, the red, green, and blue primary color components of the light by which the positive print is exposed will respectively be:

$$\frac{T_r}{T_o} L, \ \frac{T_g}{T_o} L, \text{ and } \frac{T_b}{T_o} L$$

With a photographic development gamma of value "$\gamma$," the resultant densities $D_c$, $D_m$, and $D_y$ of the cyan, magenta, and yellow dyes in the positive print will be:

$$D_c = \gamma \log \frac{T_r}{T_o} L \qquad (8a)$$

$$D_m = \gamma \log \frac{T_g}{T_o} L \qquad (8b)$$

$$D_y = \gamma \log \frac{T_b}{T_o} L \qquad (8c)$$

These are the resptcive densities of the dyes to the colors they are supposed to absorb, namely red, green, and blue. However, the cyan dye may also have a density $r_g D_c$ to green and a density $r_b D_c$ to blue. Similarly, the magenta dye may have a density $g_r D_m$ to red and $g_b D_m$ to blue; and the yellow dye may have a density $b_r D_y$ to red and $b_g D_y$ to green. The indicated coefficient in each case represents the fraction of the density of the dye in question to one of the other color components besides that it is intended to absorb. The resultant total density of the positive print for any one of the color components of the light incident thereon when it is viewed will therefore be the sum of the densities of all dyes to that component. Thus, the total densities to red, green, and blue will be:

$$D_r = D_c + g_r D_m + b_r D_y \qquad (9a)$$
$$D_g = D_m + b_g D_y + r_g D_c \qquad (9b)$$
$$D_b = D_y + r_b D_c + g_b D_m \qquad (9c)$$

Combining Equations 8a and 9a gives:

$$D_r = \gamma \log \frac{T_r}{T_o} L + g_r \gamma \log \frac{T_g}{T_o} L + b_r \gamma \log \frac{T_b}{T_o} L \qquad (10)$$

from which the transmission $T_{r+}$ of the positive print to the red color component is:

$$\frac{T_{r+}}{T_{o+}} = 10^{-D_r} = \left( \frac{T_r}{T_o} \right)^{-\gamma} \left( \frac{T_g}{T_o} \right)^{-g_r \gamma} \left( \frac{T_b}{T_o} \right)^{-b_r \gamma} \qquad (11a)$$

when $T_{o+}$ is the positive transmission corresponding to a completely clear area in the negative and is constant for a given photographic process and any gamma. Similarly, the green and blue positive transmissions will be:

$$\frac{T_{g+}}{T_{o+}} = 10^{-D_g} = \left(\frac{T_g}{T_o}\right)^{-\gamma}\left(\frac{T_b}{T_o}\right)^{-b_g\gamma}\left(\frac{T_r}{T_o}\right)^{-r_g\gamma} \quad (11b)$$

$$\frac{T_{b+}}{T_{o+}} = 10^{-D_y} = \left(\frac{T_b}{T_o}\right)^{-\gamma}\left(\frac{T_r}{T_o}\right)^{-r_b\gamma}\left(\frac{T_g}{T_o}\right)^{-g_b\gamma} \quad (11c)$$

The relationships expressed by Equations 11 must be simulated in order for the electronic previewer to produce a color image closely resembling that of the actual positive color photograph which will be obtained from the given negative photograph 27.

To this end, the electronic previewer circuit of Fig. 2 comprises means for directing the light transmitted by the negative along each of a plurality of paths which individually transmit respective ones of the above-mentioned red, green, and blue primary color components thereof. More specifically, means such as the half-silvered mirrors 29u and 29v and the fully silvered mirror 29w are provided for directing the light transmitted by negative photograph 27 into three parallel paths 30u, 30v, and 30w. Means are further provided for causing successive ones of those paths to sequentially transmit successive ones of the above-described primary color components of the light therein. The latter means may be a rotating color wheel 31 carrying respective 120 degree sectoral red, green, and blue filters, so that as the wheel rotates the filters for selecting each color component are sequentially interposed in each of the foregoing paths of the light from photograph 27. In order to view the image formed on screen 7 of scanning tube 1, an additional half-silvered mirror 32 may be provided between condensing lens 11 and photograph 27 so as to reflect a portion of the scanning light to another fully silvered mirror 33. The latter then reflects that light along a path through the color wheel 31 for visual observation of the image on screen 7.

The electronic previewer of Fig. 2 further comprises a plurality of electro-optical means such as the photocell amplifiers 34u, 34v, and 34w respectively responsive to the light in each of the paths from photograph 27 to produce corresponding electrical signals $e_u$, $e_v$, and $e_w$. The distinction between these signals is that the light from which each is derived passes through a different one of the three sectoral filters R, G, and B carried by color wheel 31. In the momentary situation depicted in Fig. 2, the red color filter is in the path 30u corresponding to the signal $e_u$, the blue color filter is in the path 30v corresponding to the signal $e_v$, and the green color filter is in the path 30w corresponding to the signal $e_w$. Of course, as wheel 31 rotates, the signals $e_u$, $e_v$, and $e_w$ will successively be derived in response to the red, green, and blue color components of the light transmitted by negative photograph 27.

Photocell amplifier 34u may have an adjustable output control switch 18u by which the relative amplitudes of signal $e_u$ may be controlled during the red, green, and blue intervals, respectively, of the light in path 30u. Switch 18u may have 3 contacts over which its rotor is driven at the same speed of rotation as color wheel 31, the contacts respectively being connected to amplifier 34u by individually adjustable resistors for establishing voltage division factors $k_r$, $k_g$, and $k_b$, respectively, at the rotor. Signal $e_u$ is obtained across a fixed reactor connected between the rotor and ground.

Similar to the embodiment of the invention in Fig. 1, the previewer in Fig. 2 includes nonlinear signal processing means for nonlinearly modifying and combining the signals $e_u$, $e_v$, and $e_w$ so as to derive a resultant control signal $e_5$ which is supplied to the scanning means, specifically to the control grid of cathode-ray tube 1, to control the intensity of the scanning beam it produces. This signal modification and combination is such that the relationship between the intensity of each color component of the scanning beam and the transmission thereof by the negative photograph is the same as the relationship between the transmissions of that photograph and of the positive photograph to be obtained therefrom for the same color components. More specifically, the signal processing means may comprise the logarithmic amplifiers 35u, 35v, and 35w which respectively logarithmically modify signals $e_u$, $e_v$, and $e_w$ to obtain corresponding modified signals $e'_u$, $e'_v$, and $e'_w$ which are then added to derive a resultant logarithmic control signal at the terminal 39. The modification of each of these signals is in accordance with the gamma employed in the photographic process corrected for the degree to which the dyes of the positive color photograph corresponding to the respective primary color components of the negative also affect other ones of those color components of the light incident on the positive when it is viewed. For example, when color wheel 31 is positioned so that the filters R, B, and G are respectively in the paths 30u, 30w, and 30v, the signal $e_u$ will be modified in accordance with the photographic gamma corrected for the degree to which the green- and blue-absorbing dyes in the positive photograph also absorb red. The signal $e_u$ will be modified in accordance with the foregoing correction as well as by a further factor corresponding to the degree to which the green-absorbing or magenta dye contributes to absorption of red. This factor corresponds to the factor $g_r$ in Equation 11a above. Similarly, the signal $e_w$ will be modified in accordance with the correction of signal $e_u$ as well as a further factor corresponding to the degree to which the blue-absorbing or yellow dye contributes to absorption of red. This is the factor $b_r$ in Equation 11a. After a 120° rotation of color wheel 31 in the indicated direction, the green filter will be in the path 30u, the blue filter will be in the path 30v, and the red filter will be in the path 30w. In this condition the modification of signal $e_u$ by amplifier 35u will be in accordance with the photographic gamma corrected for the degree to which the blue- and red-absorbing dyes also absorb green. The signal $e_v$ will be modified in accordance with the foregoing as well as by the factor $b_g$ corresponding to the degree to which the blue-absorbing dye contributes to absorption of green. The signal $e_w$ will be similarly modified in accordance with the factor $r_g$ corresponding to the degree to which the red-absorbing dye contributes to absorption of green. After a still further 120° rotation of color wheel 31 the third and final possible condition will exist, whereby the filters in paths 30u, 30v, and 30w will respectively be B, R, and G. The signal $e_u$ is then modified by amplifier 35a in accordance with the photographic gamma corrected for the absorption of blue by the red- and green-absorbing dyes. Also, signals $e_v$ and $e_w$ will each be modified in that way as well as by the factors $r_b$ and $g_b$, respectively, corresponding to the contributions of those dyes to absorption of blue.

To effect such sequential change in the degree of logarithmic modification effected by each of amplifiers 35u, 35v, and 35w, they may each be constructed to first effect uniform logarithmic translation of the applied signal, followed by linear modification thereof by applying it via individual resistors of different values to each of the three 120° arcuate contacts of a rotary switch. Three such switches 36u, 36v, and 36w are provided for amplifiers 35u, 35v, and 35w, respectively, being connected thereto as described by the respective sets of resistors 37u, 37v, and 37w. Each switch has a rotary arm which is sequentially connected to its contacts at the same speed of rotation as color wheel 31, each switch arm being connected to ground by a resistor. Thus, as color wheel 31 rotates, the output signal from each of logarithmic amplifiers 35u, 35v, and 35w is sequentially subjected to voltage division corresponding to multiplication by fractional factors determined by the ratios of the values of the resistors connected to the successive switch contacts to the value of the resistor connected to the rotary arm. In the case of switch 36u, these factors may be denoted $$\frac{u_r}{2}, \frac{u_g}{2}, \text{ and } \frac{u_b}{2}$$

and are respectively applicable to positioning of filters R, G, and B in light path 30u. The corresponding factors produced by switch 36v will be denoted $$\frac{v_r}{2}, \frac{v_g}{2}, \text{ and } \frac{v_b}{2}$$

respectively applicable to interposition of filters G, B, and R in light path 30v. Finally, the corresponding factors for switch 36w will be $$\frac{w_r}{2}, \frac{w_g}{2}, \text{ and } \frac{w_b}{2}$$

and are respectively applicable when filters B, R, and G are in the light path 30w.

The foregoing arrangement may be readily established by employing a three-level switch with a common driving shaft for the rotors at all levels, the switch shaft being geared to the drive shaft of color wheel 31 so as to rotate therewith at the same speed. The resultant logarithmically modified output signals $e'_u$, $e'_v$, and $e'_w$ are obtained across the resistors connected to the switch rotors, respectively, and are applied through respective resistors to a common terminal 39 at which they are added to obtain a logarithmic control signal $e'_u + e'_v + e'_w$. This signal is then applied to an exponential amplifier 23, as in Fig. 1, to obtain the corresponding antilog control signal $e_5$ which is applied to the control grid of scanner tube 1 to control the scanning beam intensity.

Considering now the manner in which the foregoing construction achieves simulation of the actual photographic process for deriving the positive color photograph, when color wheel 31 is positioned as illustrated the signal $e_u$ derived by photocell amplifier 34u from the light transmitted in path 30u may be expressed as $k_r L_1 T_r$, when $L_1$ is the scanning light intensity incident on negative photograph 27, $T_r$ is the red transmission thereof, and $k_r$ is the degree to which the gain of amplifier 34u is varied from the level of each of amplifiers 34v and 34w. The signals $e_v$ and $e_w$ may be expressed as $L_1 T_g$ and $L_1 T_b$, $T_g$ and $T_b$ respectively being the green and blue transmissions of negative photograph 27. The signals $e_u$, $e_v$, and $e_w$ are respectively applied to logarithmic amplifiers 35u, 35v, and 35w, and are modified thereby to obtain signals $e'_u$, $e'_v$, and $e'_w$ given by:

$$e'_u = \frac{u_r}{2} \log e_u = \log (k_r L_1 T_r)^{\frac{u_r}{2}} \quad (12a)$$

$$e'_v = \frac{v_r}{2} \log e_v = \log (L_1 T_g)^{\frac{v_r}{2}} \quad (12b)$$

$$e'_w = \frac{w_r}{2} \log e_w = \log (L_1 T_b)^{\frac{w_r}{2}} \quad (12c)$$

The summation signal obtained at terminal 39 will then be:

$$e'_u + e'_v + e'_w = \log \left[ L_1^{\frac{u_r+v_r+w_r}{2}} (k_r T_r)^{\frac{u_r}{2}} T_g^{\frac{v_r}{2}} T_b^{\frac{w_r}{2}} \right] \quad (13)$$

The corresponding antilog control signal $e_5$ obtained by exponential amplifier 23 will therefore be:

$$e_5 = \left[ L_1^{\frac{u_r+v_r+w_r}{2}} (k_r T_r)^{\frac{u_r}{2}} T_g^{\frac{v_r}{2}} T_b^{\frac{w_r}{2}} \right] \quad (14)$$

By means of bias control potentiometer 9 of scanning tube 1, the scanner may be biased nearby to cutoff when the control signal $e_5$ is zero. As a result, the scanning light output intensity will be substantially proportional to $(e_5)^2$. Accordingly, $$L_1 = k_2 e_5^2 = k_2 L_1^{u_r+v_r+w_r} (k_r T_r)^{u_r} T_g^{v_r} T_b^{w_r} \quad (15)$$

Equation 15 may be solved for the light intensity $L_1$, giving:

$$L_1 = N(k_r T_r)^{\frac{-u_r}{u_r+v_r+w_r-1}} T_g^{\frac{-v_r}{u_r+v_r+w_r-1}} T_b^{\frac{-w_r}{u_r+v_r+w_r-1}} \quad (16)$$

where N is a constant. Comparing this with Equation 11a above for the relationship between the red transmissions of the negative and positive color photographs, it is apparent that the two will be of the same form if the exponents of $T_r$, $T_g$, and $T_b$ in Equation 16 are respectively equal to $\gamma$, $g_r\gamma$, and $b_r\gamma$. The required values of $u_r$, $v_r$, and $w_r$ may therefore be established by assuming the foregoing equalities to exist and solving them for the latter values in terms of the photographic quantities $\gamma$, $g_r$, and $b_r$ appearing in the exponents in Equation 11a. Following this procedure, it is found that:

$$u_r = \frac{\gamma}{\gamma + g_r\gamma + b_r\gamma - 1} \quad (17a)$$

$$v_r = g_r u_r \quad (17b)$$

$$w_r = b_r u_r \quad (17c)$$

In addition, the value of $k_r$ as adjusted by potentiometer 18u corresponds to increasing the red component of the printing light employed in the actual photographic process by a proportional amount from the intensity matching that of the green and blue components thereof. The conditions required by Equation 17a may be readily established inasmuch as the values of $\gamma$, $g_r$, and $b_r$ are known for the particular film process involved.

A similar analysis of the required signal modification for the other two 120° sectoral positions of color wheel 31 yields required values of $u_g$, $v_g$, and $w_g$ and of $u_b$, $v_b$, and $w_b$ of the same form as Equations 17, specifically:

$$u_g = \frac{\gamma}{\gamma + b_g\gamma + r_g\gamma - 1} \quad (18a)$$

$$v_g = b_g u_g \quad (18b)$$

$$w_g = r_g u_g \quad (18c)$$

and $$u_b = \frac{\gamma}{\gamma + r_b\gamma + g_b\gamma - 1} \quad (19a)$$

$$v_b = r_b u_b \quad (19b)$$

$$w_b = g_b u_b \quad (19c)$$

Once the foregoing values have been computed, the voltage division factors of switches 36u, 36v, and 36w may be adjusted in accordance therewith so as to establish the requisite logarithmic signal modification by each of amplifiers 35a, 35b, and 35c for providing proper gamma and dye cross-coupling simulation.

As in the previewer in Fig. 1 for black-and-white film, the control potentiometer 18u of photocell amplifier 34u of the previewer in Fig. 2 may be adjusted from an initial calibration condition until the observed image as seen through color wheel 31 has a substantially optimum appearance. This may involve adjustment for the case of any or all of the sequential color components of light incident on that photocell amplifier. A proportional adjustment from a corresponding calibration condition of the relative intensities of the same color components of the printing light employed in the actual photographic process will then yield a positive color picture of similar optimum appearance.

While the invention has been described with reference to various specific embodiments thereof, it will be apparent to those skilled in the art that many variations and modifications thereof may be made without departing from the true teachings and scope of the invention as defined in the ensuing claims.

What is claimed is:

1. An electronic previewer for producing an electronic preview image of the positive photograph which will be obtained from a given negative photograph by a photographic development process, said previewer comprising: scanning means for producing a beam of scanning light of an intensity dependent on a control voltage supplied to the scanning means; means for directing the scanning beam along each of a plurality of paths of which at least one includes said negative photograph; a plurality of electro-optical means respectively responsive to the light transmitted by said negative photograph in said one path and to that in at least one of the other of said plurality of paths to produce corresponding electrical signals; and nonlinear signal processing means for nonlinearly modifying and combining said signals so as to derive a resultant control signal which is supplied to said scanning means to control the intensity of the scanning beam produced thereby, the signal modification and combination effected by said nonlinear signal processing means being such that the relationship between the intensity of said scanning beam and the transmission of said negative photograph is the same as the relationship between the transmission of that photograph and the positive photograph to be obtained therefrom; whereby the light produced by said scanning means will form said electronic preview image of said positive photograph.

2. An electronic previewer for producing an electronic preview image of the positive photograph which will be obtained from a given negative photograph by a photographic development process, said previewer comprising: scanning means for producing a beam of scanning light of an intensity dependent on a control voltage supplied to the scanning means; means for directing the scanning beam along each of a plurality of paths of which at least one includes said negative photograph; a plurality of electro-optical means respectively responsive to the light transmitted by said negative photograph in said one path and to that in at least one of the other of said plurality of paths to produce corresponding electrical signals; signal processing means for logarithmically modifying each of said signals and combining the modified signals so as to derive a resultant logarithmic control signal; and means for deriving a control signal corresponding to the antilog of said logarithmic control signal and supplying it to said scanning means to control the intensity of the scanning beam produced thereby, the signal modification and combination effected by said signal processing means being such that the relationship between the intensity of said scanning beam and the transmission of said negative photograph is the same as the relationship between the transmissions of that photograph and the positive photograph to be obtained therefrom; whereby the light produced by said scanning means will form said electronic preview image of said positive photograph.

3. An electronic previewer for producing an electronic preview image of the positive photograph which will be obtained from a given negative photograph by a photographic development process, said previewer comprising: scanning means for producing a beam of scanning light of an intensity dependent on a control voltage supplied to the scanning means; means for directing the scanning beam along each of a plurality of paths of which at least one includes said negative photograph; a plurality of electro-optical means respectively responsive to the light transmitted by said negative photograph in said one path and to that in at least one of the other of said plurality of paths to produce corresponding electrical signals; signal processing means for logarithmically modifying each of said signals and additively combining the modified signals, the modification of the signals corresponding to the light transmitted in at least one of the other of said paths being in accordance with the gamma employed in said photographic development process; and means for deriving a control signal corresponding to the antilog of said combined modified signals and supplying it to said scanning means to control the intensity of the scanning beam produced thereby, the signal modification and combination effected by said signal processing means such that the relationship between the intensity of said scanning beam and the transmission of said negative photograph is the same as the relationship between the transmissions of that photograph and the positive photograph to be obtained therefrom; whereby the light produced by said scanning means will form said electronic preview image of said positive photograph.

4. An electronic previewer for producing an electronic preview image of the positive photograph which will be obtained from a given negative photograph by a photographic development process, said previewer comprising: scanning means for producing a beam of scanning light of an intensity proportional to a predetermined power of a control voltage supplied to the scanning means; means for directing the scanning beam along each of a pair of paths of which one includes said negative photograph; a pair of photocell amplifiers respectively responsive to the light transmitted by said negative photograph in said one path and to that in the other of said paths to produce a pair of electrical signals respectively proportional to the intensities thereof; and nonlinear signal processing means for nonlinearly modifying and combining said signals so as to derive a resultant control signal which is supplied to said scanning means to control the intensity of the scanning beam produced thereby, the signal modification and combination effected by said nonlinear signal processing means being such that the relationship between the intensity of said scanning beam and the transmission of said negative photograph is the same as the relationship between the transmissions of that photograph and the positive photograph to be obtained therefrom; whereby the light produced by said scanning means will form said electronic preview image of said positive photograph.

5. An electronic previewer for producing an electronic preview image of the positive photograph which will be obtained from a given negative photograph by a photographic development process, said previewer comprising: scanning means for producing a beam of scanning light of an intensity proportional to a predetermined power of a control voltage supplied to the scanning means; means for directing the scanning beam along each of a pair of paths of which one includes said negative photograph; a pair of photocell amplifiers respectively responsive to the light transmitted by said negative photograph in said one path and to that in the other of said paths to produce a pair of electrical signals respectively proportional to the intensities thereof; signal processing means for logarithmically modifying each of said signals and additively combining the modified signals, the logarithmic modification of the signal corresponding to the light in said other path being in accordance with the product of said power and the gamma employed in said photographic development process; and means for deriving a control signal corresponding to the antilog of said combined modified signals and supplying it to said scanning means to control the intensity of the scanning beam produced thereby, the signal modification and combination effected by said logarithmic signal processing means being such that the relationship between the intensity of said scanning beam and the transmission of said negative photograph is the same as the relationship between the transmissions of that photograph and the positive photograph to be obtained therefrom; whereby the light produced by said scanning means will form said electronic preview image of said positive photograph.

6. An electronic previewer for producing an electronic preview image of the positive photograph which will be obtained from a given negative photograph by a photographic development process, said previewer comprising: scanning means for producing a beam of scanning light of an intensity proportional to a predetermined power of a control voltage supplied to the scanning means; means for directing the scanning beam along each of a pair of paths of which one includes said negative photograph; a pair of photocell amplifiers respectively responsive to the light transmitted by said negative photograph in said one path and to that in the other of said paths to produce first and second electrical signals respectively proportional to the intensities thereof; means for logarithmically translating said first signal to obtain a modified signal proportional to the logarithm of the first signal raised to the reciprocal of said power; means for logarithmically translating said second signal to obtain a modified signal proportional to the logarithm of the second signal raised to the reciprocal of the product of said power and the gamma employed in said photographic development process, said two signal translating means being connected so as to effect additive combination of said two modified signals; and means for deriving a control signal corresponding to the antilog of said combined modified signals and supplying it to said scanning means to control the intensity of the scanning beam produced thereby; whereby the light produced by said scanning means will form said electronic preview image of said positive photograph.

7. An electronic previewer for producing an electronic preview color image of the positive color photograph which will be obtained from a given negative color photograph by a photographic development process whereby a set of primary color dyes is produced in the positive photograph in response to the transmissions of the negative photograph for the same primary color components, said previewer comprising: scanning means for producing a beam of scanning light on said negative color photograph, the intensity of said beam being dependent on a control voltage supplied to the scanning means; means for directing the light transmitted by said negative color photograph along each of a plurality of paths which individually transmit respective ones of said primary color components of the light therein; a plurality of electro-optical means respectively responsive to the light in each of said plurality of paths to produce corresponding electrical signals; and nonlinear signal processing means for nonlinearly modifying and combining said signals so as to derive a resultant control signal which is supplied to said scanning means to control the intensity of the scanning beam produced thereby, the signal modification and combination effected by said nonlinear signal processing means being such that the relationship between the intensity of each of said color components of said scanning beam and the transmission thereof by said negative photograph is the same as the relationship between the transmissions of said negative photograph and the positive photograph to be obtained therefrom for the same color components; whereby the light produced by said scanning means will form said electronic preview color image of said positive color photograph.

8. An electronic previewer for producing an electronic preview color image of the positive color photograph which will be obtained from a given negative color photograph by a photographic development process whereby a set of primary color dyes is produced in the positive photograph in response to the transmissions of the negative photograph for the same primary color components, said previewer comprising: scanning means for producing a beam of scanning light on said negative color photograph, the intensity of said beam being dependent on a control voltage supplied to the scanning means; means for directing the light transmitted by said negative photograph along each of a plurality of paths; means for causing successive ones of said paths to sequentially transmit successive ones of said primary color components of the light therein; a plurality of electro-optical means respectively responsive to the light in each of said plurality of paths to produce corresponding electrical signals; and nonlinear signal processing means for nonlinearly modifying and combining said signals so as to derive a resultant control signal which is supplied to said scanning means to control the intensity of the scanning beam produced thereby, the signal modification and combination effected by said nonlinear signal processing means being such that the relationship between the intensity of each of said color components of said scanning beam and the transmission thereof by said negative photograph is sequentially the same as the relationship between the transmissions of said negative photograph and the positive photograph to be obtained therefrom for the sequentially transmitted ones of those color components; whereby the light produced by said scanning means will form said electronic preview color image of said positive color photograph.

9. An electronic previewer for producing an electronic preview color image of the positive color photograph which will be obtained from a given negative color photograph by a photographic development process whereby a set of primary color dyes is produced in the positive photograph in response to the transmissions of the negative photograph for the same primary color components, said previewer comprising: scanning means for producing a beam of scanning light on said negative color photograph, the intensity of said beam being dependent on a control voltage supplied to the scanning means; means for directing the light transmitted by said negative photograph along each of a plurality of paths; means for sequentially interposing each of a set of filters for respective ones of said primary color components in each of said paths; a plurality of electro-optical means respectively responsive to the light in each of said plurality of paths to produce corresponding electrical signals; and nonlinear signal processing means for nonlinearly modifying and combining said signals so as to derive a resultant control signal which is applied to said scanning means to control the intensity of the scanning beam produced thereby, the signal modification and combination effected by said nonlinear signal processing means being such that the relationship between the intensity of each of said color components of said scanning beam and the transmission thereof by said negative photograph is sequentially the same as the relationship between the transmissions of said negative photograph and the positive photograph to be obtained therefrom for the sequentially filtered ones of those color components; whereby the light produced by said scanning means will form said electronic preview color image of said positive color photograph.

10. An electronic previewer for producing an electronic preview color image of the positive color photograph which will be obtained from a given negative color photograph by a photographic development process whereby a set of primary color dyes is produced in the positive photograph in response to the transmissions of the negative photograph for the same primary color components, said previewer comprising: scanning means for producing a beam of scanning light on said negative color photograph, the intensity of said beam being dependent on a control voltage supplied to the scanning means; means for directing the light transmitted by said negative color photograph along each of a plurality of paths which individually transmit respective ones of said primary color components of the light therein; a plurality of electro-optical means respectively responsive to the light in each of said plurality of paths to produce corresponding electrical signals; signal processing means for logarithmically modifying each of said signals and combining the modified signals so as to derive a resultant logarithmic control signal; and means for deriving a control signal corresponding to the antilog of said logarithmic control signal and supplying it to said scanning means to control the intensity of the scanning beam produced thereby, the signal modification and combination effected by said nonlinear signal processing means being such that the relationship between the intensity of each of said color components of said scanning beam and the transmission thereof by said negative photograph is the same as the relationship between the transmissions of said negative photograph and the positive photograph to be obtained therefrom for the same color components; whereby the light produced by said scanning means will form said electronic preview color image of said positive color photograph.

11. An electronic previewer for producing an electronic preview color image of the positive color photograph which will be obtained from a given negative color photograph by a photographic development process whereby a set of primary color dyes is produced in the positive photograph inr esponse to the transmissions of the negative photograph for the same primary color components, said previewer comprising: scanning means for producing a beam of scanning light on said negative color photograph, the intensity of said beam being dependent on a control voltage supplied to the scanning means; means for directing the light transmitted by said negative color photograph along each of a plurality of paths which individually transmit respective ones of said primary color components of the light therein; a plurality of electro-optical means respectively responsive to the light in each of said plurality of paths to produce corresponding electrical signals; signal processing means for logarithmically modifying the signals from each of said paths and additively combining the modified signals, the logarithmic modification of the signal from one of said paths sequentially being in accordance with the gamma of said photographic development process as corrected for the unwanted absorptions of successive ones of said primary color components by said dyes, and the logarithmic modification of the signals from each remaining one of said paths sequentially being in accordance with the signal modification of the signal from said one path as well as the degree to which respective ones of said dyes contribute to unwanted absorption of successive ones of said primary color components; and means for deriving a control signal corresponding to the antilog of said combined modified signals and applying it to said scanning means to control the intensity of the scanning beam produced thereby, the signal modification and combination effected by said nonlinear signal processing means being such that the relationship between the intensity of each of said color components of said scanning beam and the transmission thereof by said negative photograph is sequentially the same as the relationship between the transmissions of said negative photograph and the positive photograph to be obtained therefrom for sequential ones of those color components; whereby the light produced by said scanning means will form said electronic preview color image of said positive color photograph.

No references cited.